(12) United States Patent
Haentjes

(10) Patent No.: US 12,123,100 B2
(45) Date of Patent: Oct. 22, 2024

(54) PICKLING PLANT FOR SURFACE TREATMENT OF STRIP STEEL

(71) Applicant: SMS group GMBH, Düsseldorf (DE)

(72) Inventor: Michael Haentjes, Essen (DE)

(73) Assignee: SMS GROUP GMBH, Düsseldorf (DE)

( * ) Notice: Subject to any disclaimer, the term of this patent is extended or adjusted under 35 U.S.C. 154(b) by 657 days.

(21) Appl. No.: 17/260,721

(22) PCT Filed: Jun. 21, 2019

(86) PCT No.: PCT/EP2019/066429
§ 371 (c)(1),
(2) Date: Jan. 15, 2021

(87) PCT Pub. No.: WO2020/015950
PCT Pub. Date: Jan. 23, 2020

(65) Prior Publication Data
US 2021/0269927 A1    Sep. 2, 2021

(30) Foreign Application Priority Data

Jul. 19, 2018   (DE) ...................... 10 2018 117 475.6

(51) Int. Cl.
*C23G 3/02* (2006.01)
(52) U.S. Cl.
CPC .................................... *C23G 3/024* (2013.01)
(58) Field of Classification Search
None
See application file for complete search history.

(56) References Cited

U.S. PATENT DOCUMENTS

| 5,879,465 A * | 3/1999 | McKevitt | C23G 3/023 |
| | | | 134/41 |
| 6,016,819 A * | 1/2000 | Murray | C23G 3/023 |
| | | | 134/122 R |

(Continued)

FOREIGN PATENT DOCUMENTS

| DE | 3629894 C2 | 10/1990 |
| DE | 40 31 234 A1 | 4/1992 |

(Continued)

OTHER PUBLICATIONS

International Search Report and Written Opinion issued on Aug. 22, 2019 in corresponding International application No. PCT/EP2019/066429; 17 pgs.

(Continued)

*Primary Examiner* — Cristi J Tate-Sims
(74) *Attorney, Agent, or Firm* — Maier & Maier, PLLC

(57) ABSTRACT

A pickling system for surface treatment, using a pickling medium, of strip steel in the form of standard steel, electric strip, high-grade steel, and extra-high-strength and ultra-high-strength third-generation steel in order to thereby provide a surface suitable for a subsequent shaping process for further processing. The system includes a plurality of treatment tanks connected in series. The pickling system has a modular construction and, starting from the strip infeed, at least one first treatment tank in the form of a dipping bath module is provided in the working direction, downstream of which a plurality of treatment tanks in the form of spray pickling modules are arranged, and at least one final second dipping bath module is arranged downstream of the spray pickling modules.

6 Claims, 1 Drawing Sheet

(56) References Cited

U.S. PATENT DOCUMENTS

| | | | | |
|---|---|---|---|---|
| 2003/0015259 A1* | 1/2003 | Bunten | ................ | C23G 3/027 |
| | | | | 148/509 |
| 2017/0268113 A1* | 9/2017 | Marx | ...................... | C23G 1/08 |
| 2018/0202052 A1* | 7/2018 | Malloy | .................. | C23G 3/02 |

FOREIGN PATENT DOCUMENTS

| | | |
|---|---|---|
| DE | 9211632 U1 | 9/1993 |
| DE | 42 28 808 A1 | 3/1994 |
| DE | 10332693 A1 | 2/2005 |
| EP | 0 770 707 B1 | 5/1997 |
| EP | 0 814 180 A1 | 12/1997 |
| EP | 1 299 576 B1 | 4/2003 |
| EP | 3 029 163 A1 | 6/2016 |
| EP | 3 029 164 A1 | 6/2016 |
| JP | 57104671 A | 6/1982 |
| JP | 61235583 A | 10/1986 |
| JP | 63192882 A | 8/1988 |
| WO | 2017104926 A1 | 6/2017 |

OTHER PUBLICATIONS

International Preliminary Report issued on Oct. 29, 2020 in corresponding International application No. PCT/EP2019/066429; 21 pgs.

Written Opinion of IPEA issued on Jun. 24, 2020 in corresponding International application No. PCT/EP2019/066429; 10 pgs.

\* cited by examiner

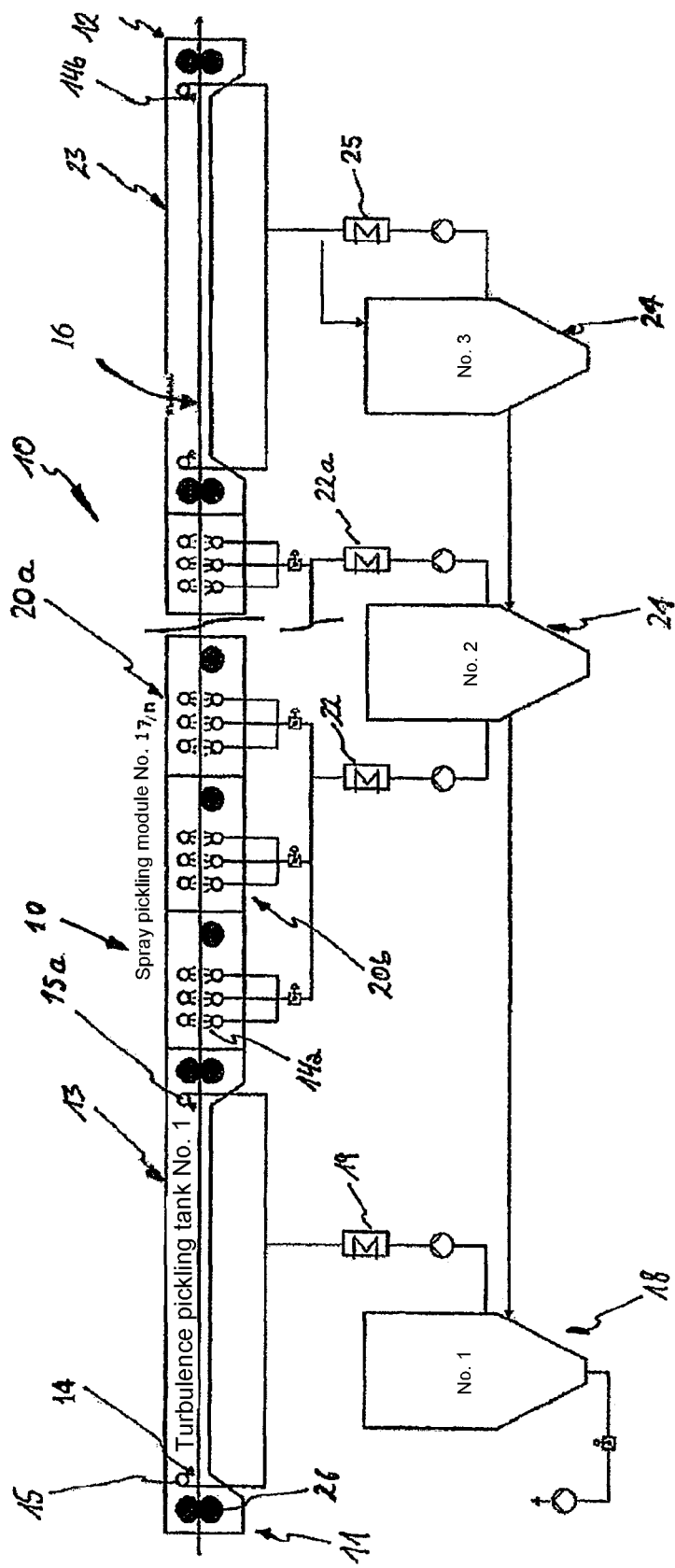

PICKLING PLANT FOR SURFACE TREATMENT OF STRIP STEEL

FIELD

The invention relates to a pickling system for surface treatment of strip steel in the form of standard steel, electric strip, high-grade steel, and extra-high-strength and ultra-high-strength third-generation steel in order to thereby provide a surface suitable for subsequent further processing steps, the system comprising a plurality of treatment tanks which can be exposed to a pickling medium.

BACKGROUND

Third-generation steels in this case include QP steel and mid-grade manganese steel as the extra-high-strength and ultra-high-strength steels. The subsequent processing steps in this case include, particularly, rolling, deep-drawing, dip-bath galvanizing, hot-dip galvanizing, and the like.

With hot-strip steels, a layer of scale inevitably develops on the strip surface during the rolling process. This scale also has a certain composition depending on the alloy. This layer of scale also must be removed before the subsequent processing for quality assurance reasons. To this end, pickling systems have proven to be useful for removing the layer of scale by means of a pickling medium. With the aid of mechanical support (spraying the strip surface and turbulence in the pickling bath), a good pickling result can generally be achieved for a certain quality of steel.

Current pickling sections are designed flat (for example as turbulence picklers), which consist of several intermediate tanks. The steel strip is pulled or pushed through the treatment tanks. The complete pickling section is designed as a cascade, i.e. the fresh or regenerated acid is added to the final treatment tank (i.e. according to the direction of movement of the steel strip) and is then provided to the strip in the direction opposite the transport direction of the strip in order to maximize the effect of the pickling acid. Squeeze rollers, which remove the pickling acid from the treated product, are installed at the inlet and outlet of the treatment tanks. This technology is described, for example, in published application DE 40 31 234.

DE 42 28 808 A1 describes a device, which is likewise assigned to the spray pickling modules. The disadvantage of spray pickling can be considered that the surface of the treated rolled strip material is relatively rough due to the larger but differing degree of the oxide layer removal. Sometimes there is also pitting corrosion and/or etching in the region of the grain boundaries, whereby the surface quality of the treated strip material is further worsened. For the customary further processing, such as cold rolling, annealing, and/or galvanizing, such surfaces can lead to everything from problems (for example strip tears during cold rolling) to quality impairment in the end product. The technical equipment required for spray treating treated strip material is relatively extensive; in addition, the spray nozzles worsen in a relatively short time which means there is extensive maintenance required.

With conventional pickling systems, the pickling effect, however, can only be varied by adapting the pickling temperature and the pickling bath concentration. However, these parameters are extremely sluggish and thus do not enable any adaptation in a timeframe which would be sufficient for the current demands for a high degree of system flexibility.

With the known pickling systems, particularly for standard steel, the requirement particularly for surface quality continually increases. Particularly in the cold rolling and galvanizing production steps, deficits in the surface quality when pickling automatically result in problems with the end product. The pickling process is essentially a diffusion process in the laminar boundary layer, and the setting parameters of pickling bath concentration and pickling bath temperature are the speed-determining parameters in this case. In real-life applications, both parameters are very difficult to adapt. With pickling bath concentration, it is important to have constant parameter management in order to optimize the consumption of pickling medium in that, on the one hand, the transition parameters into acid regeneration can be kept constant to the extent possible and, on the other hand, the metal contents in the first pickling bath are kept at a high level in order to optimize the old acid quantities accordingly, i.e. to minimize. The pickling bath temperature can only be adapted within a range of 1 to 2° C./min, which means that the adaptations to individual production coils in real life applications cannot be implemented with the minimum coil run-times (2 to 3 minutes). This all means that the known pickling systems can no longer meet the requirements, particularly the requirements placed on the new higher-strength steels.

SUMMARY

Accordingly, the object of the present invention is to obtain a pickling system which can be flexibly adjusted to different production coils as well as the different steel qualities thereof.

This object is achieved by the disclosure in that the pickling system has a modular construction and, starting from the strip infeed, at least one first treatment tank in the form of a dipping bath module is provided in the working direction, downstream of which a plurality of treatment tanks in the form of spray pickling modules are arranged, and at least one final second dipping bath module is arranged downstream of the spray pickling modules.

A pickling system is hereby obtained which offers the maximum possible flexibility with respect to the pickling effect, because the pickling section and thus also the treatment time can be flexibly adjusted based on the strip to be treated by means of the spray pickling modules which can be switched on and off. Thus, steels of different quality can be treated in a pickling system one after the other directly without retrofitting and adaptations to the pickling system being necessary in this case. Particularly the provided spray pickling cells offer the option of keeping the laminar boundary layer as small as possible between the pickling solution and the metal surface. Thus, the diffusion processes taking place therein are not only optimized by the increased exchange of substances and improved transfer of heat, but also the length of transfer and thus the treatment time is also shortened.

It has been shown that streaks can form on the strip surface after the spray pickling treatment with the strip materials to be treated, which in turn could lead to problems with the subsequent processes (cold rolling, galvanizing, etc.). Thus, it is provided according to the invention to arrange pickling baths upstream and downstream of the actual spray pickling. The upstream pickling bath in this case should preheat the pickled strip material accordingly and remove any potential dirt and insoluble components from the surface and thus ensure that an extensively clean pickling liquid is available in the subsequent spray pickling process, and thus clogging of the spray nozzles can be prevented. The pickling bath downstream thereof creates a homogenous strip surface in that potential streaking, etc. caused by this process step can be leveled out. Both pickling baths enable the complete or individual switch-on/switch-off of the spray modules during operation of the pickling system and thus a practically complete level of flexibility in the treatment time (pickling time) within the scope of these variable treatment lengths.

The functions of the first pickling bath, in the design as a turbulence pickling tank, are described in greater detail in the following.

Preheating the steel strip: Due to the low concentration of free acid (30-40 g HCl/l) in this tank, the pickling effect is only slight, and the bath mainly functions as a preheating step.

Sludge accumulation: Due to the high concentration of metal in this bath (120-140 g Fe/l), the other metals and the oxides thereof (Si etc.) occur in maximum concentration, and thus the insoluble components are present in greater concentrations. Therefore, a pure spray pickling operation is generally only conceivable in this area on a limited basis.

The function of the second pickling bath, in the design as a turbulence pickling tank, is described in greater detail in the following.

Due to the turbulence pickling tank, the streaking caused by the spray pickling is leveled out and a uniform appearance of the pickled surface is set.

This pickling tank also means that the upstream spray pickling cells may be taken out of operation completely and a pickling result good enough for the steel quality to be treated is still achieved (minimum strip speed/pickling effect).

The function of the spray pickling modules in the pickling system constructed modularly according to the invention is summarized in the following.

Most flexible adaptation possible of the pickling effect: the pickling effect of each individual module can be adapted quickly due to the switch-on/switch-off of the individual modules by means of switching valves.

Best pickling effect: the best pickling rates are also to be expected here due to the optimum concentration regions in this bath. In addition, the exchange of substances and heat during spraying is at the maximum accordingly.

A potential clogging can also be prevented due to suitable nozzle selection and the concentration ratios at hand.

Due to the use of the modules, the total pickling time is shortened, as compared to conventional turbulence pickling.

It is provided in this case to use rinsing cells that are as structurally identical and/or similar as possible.

Strip support is provided between the cells by means of rollers or possibly granite stones.

The individual modules can be supplied with pickling medium from a circulation tank or integrated reservoirs.

The invention is explained in greater detail in the following by means of an exemplary embodiment with reference to the single appended FIGURE.

BRIEF DESCRIPTION OF THE DRAWING(S)

The single FIGURE is a schematic representation of a modularly constructed pickling system (pickling section) according to the invention.

DETAILED DESCRIPTION

As shown in the FIGURE, the pickling system (10) according to the invention is constructed modularly. A first dipping bath module (13) is provided in the working direction starting from the strip infeed (11) to the strip outfeed (12). In this embodiment, the dipping bath module (13) is formed as a turbulence pickling tank, in which a pickling medium (14) is provided to a strip (16) to be treated via beams of spray (15, 15a) in the infeed, outfeed, and lateral parts. The pickling medium (14) is stored in a first circulation container (18) and is supplied to the turbulence tank (13) as needed via corresponding supply lines and discharge lines. A heat exchanger (19) is provided for adjusting the temperature of the pickling medium (14). The turbulence pickling tank (13) only has a low volume and sludge deposits are kept low due to the tank base. A dipping cover (not shown) forms the upper side of the pickling channel which effectively seals off the turbulence pickling tank (13). This means less evaporation loss and significant savings, because the pickling system thus consumes significantly less energy and pickling medium (acid).

At least one spray pickling module (17) is connected downstream of the first turbulence tank (13) in the working direction. The pickling medium (acid) is sprayed onto the strip (16) from above and below, in the installation position, from a plurality of nozzles and/or spray lances (20, 20a, 20b), which are arranged distributed over the width of the strip (16). In this manner, a large portion of the scaling is mechanically removed upon the impact of the pickling medium onto the strip (16). It is provided that a plurality of spray modules (n) can be connected in series in order to individually adapt the spray pickling module line in length as well to the space conditions at the installation location. The spray pickling modules (17, n) are supplied with fresh or prepared pickling medium (14a) via a second circulation container (21). Heat exchangers (22, 22a) can be provided here which can regulate the temperature of the pickling medium (14a).

A second dipping bath module (23), which is likewise designed as a turbulence pickling tank in this embodiment and finally treats the strip (16) with a pickling medium (14b), is arranged at the end of this modularly constructed pickling system. The pickling medium (14b) in this case is stored in a third circulation tank (24) and is provided to the turbulence pickling tank (23) as needed via corresponding supply lines and discharge lines. The temperature of the pickling medium (14b) can also be set by means of a heat exchanger (25) in this case. The strip (16) is held by means of support and/or squeeze rollers (26) over the entire length of the pickling system (10) from the infeed (11) to the outfeed (27). For the sake of clarity, only one support and/or squeeze roller (26) has been provided with the corresponding reference numerals in the FIGURE. Equivalent components have the same reference numerals.

LIST OF REFERENCE NUMERALS

10 Pickling system (pickling part)
11 Strip infeed
12 Strip outfeed
13 First dipping bath module (turbulence pickling tank)
14, 14a, 14b Pickling medium (acid)
15, 15a Beams of spray (nozzles)
16 Strip
17, n Spray pickling module
18 First circulation container for the pickling medium
19 Heat exchanger
20, 20a, 20b Spray lances (nozzles)
21 Second circulation container for the pickling medium
22, 22a Heat exchanger 23 Second dipping bath module (turbulence pickling tank)
24 Third circulation container for the pickling medium
25 Heat exchanger
26 Support and/or squeeze rollers (strip support)

The invention claimed is:

1. A pickling system comprising:
a first turbulence tank, coupled to a first pickling medium, provided in a working direction starting from a strip infeed and configured to preheat steel strips prior to spray pickling;
a plurality of treatment tanks, coupled to a second pickling medium and arranged downstream from the first turbulence tank, in the form of spray pickling modules, wherein the spray pickling modules are configured to be actuated individually and independently of one another chronologically, an exposure time of a strip to be treated with the second pickling medium is adjusted individually as a function of steel quality of the strip, and the spray pickling modules are configured to be switched on and off individually in number and in spray intensity as a function of the steel quality of the strip;
a second turbulence tank, coupled to a third pickling medium, downstream of the spray pickling modules, wherein temperatures of the first pickling medium, the second pickling medium, and the third pickling medium are separately adjusted.

2. The pickling system according to claim 1, wherein the spray pickling modules are spray pickling cells which are as structurally identical as possible, which are configured to be supplied with the pickling medium from at least one circulation tank or integrated reservoirs.

3. The pickling system according to claim 2, wherein a strip support is configured to be provided between the spray pickling cells by means of rollers or granite stones.

4. The pickling system according to claim 1, wherein the concentration of free acid at least in the first turbulence tank is in the range of 30-40 g HCl/l, such that the pickling effect on a strip to be treated is low.

5. The pickling system according to claim 4, wherein the first turbulence tank is configured to perform strip preheating.

6. The pickling system according to claim 5, wherein coarse, insoluble components of the scaling originating from the surface of the strip are configured to be removed in the first turbulence tank before the infeed of the strip into the downstream spray pickling cells.

* * * * *